(No Model.)

R. T. FERGUSON.
HORSE BOOT.

No. 431,111. Patented July 1, 1890.

Witnesses:
Horace G. Seitz
W. S. Duvall

Inventor
Robert T. Ferguson
By his Attorneys
C. A. Snow & Co.

UNITED STATES PATENT OFFICE.

ROBERT T. FERGUSON, OF PITTSFIELD, ILLINOIS.

HORSE-BOOT.

SPECIFICATION forming part of Letters Patent No. 431,111, dated July 1, 1890.

Application filed March 21, 1890. Serial No. 344,773. (No model.)

*To all whom it may concern:*

Be it known that I, ROBERT T. FERGUSON, a citizen of the United States, residing at Pittsfield, in the county of Pike and State of Illinois, have invented a new and useful Horse-Boot, of which the following is a specification.

This invention has relation to interfering boots for horses; and among the objects in view are to provide such a boot as will interfere with the striking of the hoof of young horses so as to prevent bruising and cutting themselves during travel and before their regular gaits have been formed.

A further object of the invention is to provide a device of simple and cheap construction that may be applied to any ordinary boot, whereby the same is better adapted to perform the functions intended.

With the above objects in view, the invention consists in certain features of construction hereinafter specified, and particularly pointed out in the claim.

Figure 1:
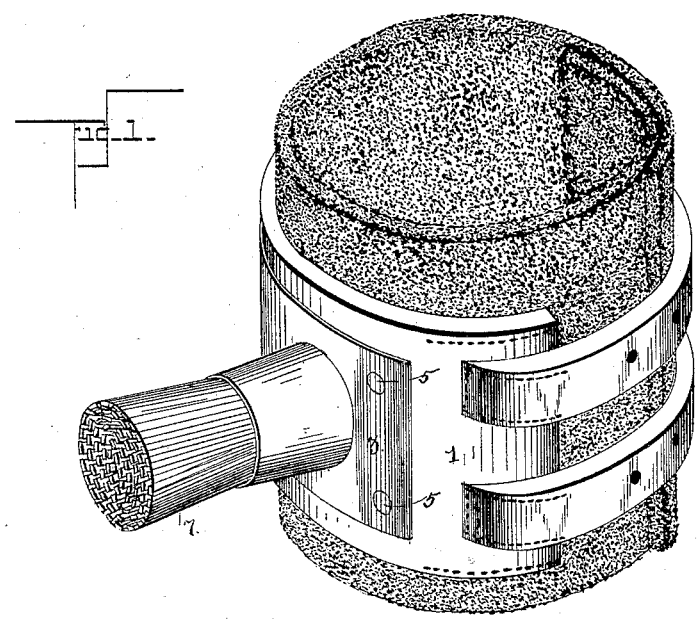
Figure 2:
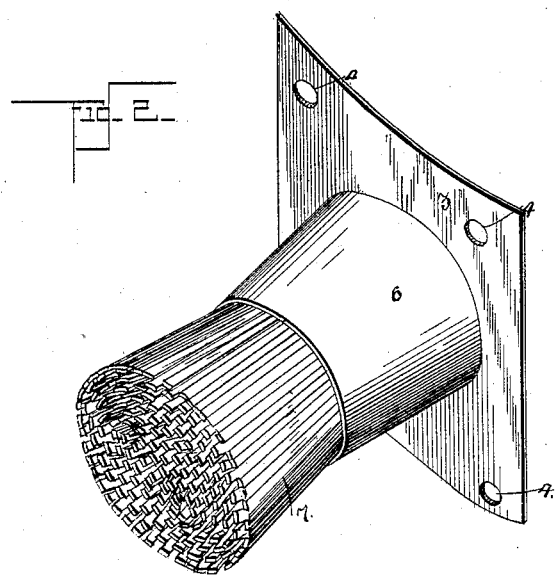

Referring to the drawings, Figure 1 is a perspective of an interfering boot constructed in accordance with my invention. Fig. 2 is a detail in perspective of the socket and securing-plate for the reception of the brush.

Like numerals of reference indicate like parts in both figures of the drawings.

1 represents an ordinary horse-boot formed of leather and terminating at one end in ordinary connecting-straps and at its opposite end in opposite buckles for connecting with the straps. The boot 1 may be of any ordinary construction, and in the present instance I have shown a device in connection with the simplest form.

The interfering device consists of a plate adapted to be secured in any suitable manner to the boot and having formed thereon a laterally-projecting socket or cup, in which is mounted a tuft of stiff bristles, preferably of rattan, which projects from the cup or socket, and by coming in contact with the hoof of the horse serves to obviate the striking of the hoofs in passing each other and train the animal in his movement without in any way affecting his gait.

3 represents the sheet-metal plate, which in this instance is rectangular, and provided at its four corners with perforations 4, through which are inserted rivets 5, passed through the plate and the boot, and are headed within the latter. From the center of the plate there projects laterally a hollow cup or socket 6, and in the same there is seated a tuft 7, preferably formed of rattan, the ends of the tuft being cut squarely off and projecting from the socket so as to strike the opposite hoof should the same be brought dangerously near that hoof upon which the boot is located, whereby the animal will soon learn to travel with his hoofs at a proper distance apart. The nature of the tuft is such as while being sufficiently stiff to impress the animal with its presence, yet will not in any way scratch, bruise, or cut his limbs should they come in contact with the same.

Having thus described my invention, what I claim is—

The horse-boot having the securing-plate 3 fastened upon its side, said plate being provided with a cup or socket, and a tuft of stiff interfering bristles secured in and projecting from the cup, substantially as specified.

In testimony that I claim the foregoing as my own I have hereto affixed my signature in presence of two witnesses.

ROBERT T. FERGUSON.

Witnesses:
W. S. BINNS,
W. S. THOMAS.